(12) United States Patent
Zhou et al.

(10) Patent No.: US 8,098,572 B2
(45) Date of Patent: Jan. 17, 2012

(54) INTERFACE MONITORING FOR LINK AGGREGATION

(75) Inventors: Junlan Zhou, Sunnyvale, CA (US);
Zhengrong Ji, Sunnyvale, CA (US);
Yuguang Wu, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 23 days.

(21) Appl. No.: 12/364,634

(22) Filed: Feb. 3, 2009

(65) Prior Publication Data
US 2010/0195489 A1    Aug. 5, 2010

(51) Int. Cl.
*H04L 12/24* (2006.01)
*H04L 12/26* (2006.01)
(52) U.S. Cl. .................... 370/216; 370/242
(58) Field of Classification Search .......... 370/242, 370/219–221, 241, 241.1, 216, 217; 709/220
See application file for complete search history.

(56) References Cited

U.S. PATENT DOCUMENTS

| | | | | |
|---|---|---|---|---|
| 5,959,968 | A * | 9/1999 | Chin et al. | 370/216 |
| 6,229,538 | B1 | 5/2001 | McIntyre et al. | |
| 6,717,909 | B2 * | 4/2004 | Leroux et al. | 370/228 |
| 7,251,217 | B2 | 7/2007 | Wong et al. | |
| 7,529,180 | B1 * | 5/2009 | Karl et al. | 370/216 |
| 7,813,263 | B2 * | 10/2010 | Chang et al. | 370/216 |
| 7,944,834 | B2 * | 5/2011 | Alesi et al. | 370/235 |
| 2002/0181392 | A1 * | 12/2002 | Okuno | 370/216 |
| 2008/0037418 | A1 * | 2/2008 | Cole et al. | 370/220 |
| 2008/0225733 | A1 * | 9/2008 | Hua et al. | 370/242 |

FOREIGN PATENT DOCUMENTS
WO    2008/007353 A2    1/2008

OTHER PUBLICATIONS

International Search Report, PCT/US2010/022974, dated Apr. 21, 2010.
FAQS ORG: "RFC 3619—Extreme Network's Ethernet Automatic Protection Switching (EAPS) Version 1" Internet Citation Oct. 2003, XP002449412 Retrieved from the Internet: URL:http://www.faqs,org/rfcs/rfc3619.html> [retrieved on Sep. 3, 2007] abstract paragraph [02.2].
Configuring OPS Clusters With ServiceGuard OPS Edition, Hewlett Packard, Mar. 2002, 412 pages.

* cited by examiner

*Primary Examiner* — Kwang B Yao
*Assistant Examiner* — Candal Elpenord
(74) *Attorney, Agent, or Firm* — Lerner, David, Littenberg, Krumholz & Mentlik, LLP (57) ABSTRACT

The present invention provides network interface monitoring and management that may be employed with link aggregation technologies. Multiple network interfaces may be aggregated into a single bond and data may be transferred to and from a backbone network via this aggregated bond. A link aggregation monitor employs a heartbeat generator, sniffer and data store to keep track of health and availability of network interfaces. The heartbeat generator sends heartbeats to the network interfaces, which pass the heartbeats around in a token ring configuration. If a network interface fails or otherwise goes offline, detection of this condition causes the monitor and heartbeat generator to prepare new or modified heartbeats so that data may be efficiently and accurately routed around the token ring and health of all remaining alive interfaces can be monitored properly. If a network interface re-enters or is added to the aggregate bond, new/modified heartbeats are then employed.

22 Claims, 5 Drawing Sheets

| Destination MAC address | Source MAC address | Ethernet protocol type | | | | |
|---|---|---|---|---|---|---|
| Slave(i+1)_mac/broadcast_mac | Slave_i_mac | ETH_P_HEARTBEAT | Seq_num | Timestamp | Padding | CRC |

INTERFACE MONITORING FOR LINK AGGREGATION

BACKGROUND OF THE INVENTION

1. Field of the Invention

The invention relates generally to computer network topologies. More particularly, the invention pertains to link aggregation interface monitoring.

2. Description of Related Art

On a networked machine, it is possible to increase the communication bandwidth or the availability of network connectivity, by using multiple interfaces concurrently. This is known as "link aggregation." Link aggregation technologies enable the machine deployed with multiple network interfaces, called "slaves," to aggregate the bandwidth of multiple interfaces, or to maintain network connectivity despite interface failures. In particular, existing link aggregation technologies support two modes of operations: load balancing or active/standby mode. Load balancing mode requires the router(s)/switch(es) (connected to the networked machine) to support link aggregation technologies as well. In load balancing mode, the networked machine uses multiple network interfaces concurrently, to transmit/receive packets and thus to aggregate the bandwidth of these interfaces. Active/standby mode does not require link aggregation support on the router(s)/switch(es) connected to the networked machine. In this mode, the networked machine only uses one network interface, referred to the "active slave," to transmit/receive packets, while the other network interfaces operate as "standby slaves" and do not transmit/receive. If the active slave fails, the networked machine switches to one of the standby slaves and uses the new active slave for transmitting and receiving packets.

It is possible for one or more links to go down or otherwise fail. A link failure may degrade or prevent communication among devices on the network. This can be a serious problem in network communication. In the past, monitoring techniques such as ARP monitoring and MII monitoring have been used to evaluate aggregated links.

In ARP monitoring ARP requests are sent to designated peers in the network and determine the health of slave interfaces based on any received ARP replies. One limitation on this technique is that it relies on the "liveness" of designated peers. Another limitation is that it may not be used in an active/standby link aggregation mode. In this mode, only one active slave is allowed to transmit and receive, and the health of standby slave interfaces (not allowed to send/receive packets) cannot be determined.

In MII monitoring, the technique monitors only the carrier state of aggregated interfaces. It does not detect interface failure when the carrier state is up but the link is down due to bad cables or other issues.

BRIEF SUMMARY OF THE INVENTION

In accordance with aspects of the present invention, robust interface monitoring and management is provided for link aggregation technologies.

In accordance with one embodiment of the present invention, a link aggregation system in a computer network is provided. The link aggregation system comprises a plurality of network interfaces and a link aggregation monitor. The plurality of network interfaces includes a first network interface and a second network interface aggregated into a single bond. They provide an aggregated communication link to a network. The link aggregation monitor is coupled to the aggregated first and second network interfaces. The link aggregation monitor is configured to provide heartbeats to and receive heartbeats from the aggregated network interfaces to determine a health status of each aggregated network interface. Each heartbeat is configured by the link aggregation monitor as an Ethernet frame having a destination address, source address and heartbeat identifier.

In one alternative, the Ethernet frame further includes a heartbeat sequence identifier and timestamp to record a system time when a given heartbeat is generated. In another alternative, if a given one of the plurality of network interfaces fails, the given network interface is removed from the aggregated bond and the link aggregation monitor prepares new heartbeats configured to omit the failed network interface. In a further example, if an additional network interface becomes available, the additional network interface is added to the aggregated bond and the link aggregation monitor prepares new heartbeats configured to include the added network interface. In yet another example, the aggregated network interfaces are arranged in a token ring configuration and the heartbeats are routed around the token ring.

In accordance with another embodiment of the present invention, a link aggregation monitoring apparatus is provided. The apparatus comprises a heartbeat generator, a data store and a sniffer device. The heartbeat generator is configured to prepare heartbeats for a plurality of network interfaces arranged in an aggregated communication link to a network. The data store is configured to maintain source and destination addresses of the heartbeats for use by each of the network interfaces. The data store is further configured to provide network interface data to the heartbeat generator. The sniffer device is configured to observe the heartbeats received by the plurality of network interfaces. The sniffer device is further configured to send information associated with the observed heartbeats to the data store. The heartbeat generator is further configured to analyze a health status of each network interface in the aggregated communication link based on the network interface data received from the data store, and to prepare new heartbeats to account for any nonfunctional network interfaces and any added network interfaces.

In one example, the data store is further configured to maintain transmission and reception statistics of selected heartbeats based on the information sent by the sniffer device. In this case, the transmission and reception statistics may include at least one of timestamps, counters and sequence numbers.

In another example, the link aggregation monitoring apparatus further comprises a user interface configured to display heartbeat statistics associated with the health status of selected network interfaces.

In an alternative example, each network interface arranged in the aggregated communication link is assigned a slave ID associated with a unique address, and each network interface uses the unique address associated with the slave ID of its heartbeat's intended receiver as a destination address. In this case, assignment of the slave IDs to respective network interfaces may depend on a link aggregation mode. Optionally, the heartbeat generator is further configured to detect a fail-over condition when a signal reports that a given one of the network interfaces arranged in the aggregated communication link has switched from a standby mode to a primary mode.

In accordance with yet another embodiment of the present invention, a link aggregation method for use in a computer network comprises: configuring a plurality of network interfaces including a first network interface and a second network interface into an aggregated single bond for providing an aggregated communication link to a network; providing heartbeats to the aggregated network interfaces for circulation among each of the network interfaces in the aggregated single bond; receiving the heartbeats from the aggregated network interfaces; and determining a health status of each aggregated network interface based upon the received heartbeats; wherein each heartbeat is configured as an Ethernet frame having a destination address, source address and heartbeat identifier.

In one example, the Ethernet frame further includes a heartbeat sequence identifier and timestamp to record a system time when a given heartbeat is generated. In another example, if a given one of the plurality of network interfaces fails, the method further comprises: removing the failed network interface from the aggregated bond; and preparing new heartbeats configured to omit the failed network interface.

In a further example, if an additional network interface becomes available, the method further comprises: adding the additional network interface to the aggregated bond; preparing new heartbeats configured to include the added network interface. And in yet another example, the aggregated network interfaces are arranged in a token ring configuration and the heartbeats are routed around the token ring.

In accordance with another embodiment of the present invention, a link aggregation monitoring method comprises preparing heartbeats for a plurality of network interfaces arranged in an aggregated communication link to a network; maintaining in a data store source and destination addresses of the heartbeats for use by each of the network interfaces, the data store being configured to provide network interface data to a heartbeat generator; observing the heartbeats received by the plurality of network interfaces with a sniffer device, the sniffer device being configured to send information associated with the observed heartbeats to the data store; analyzing a health status of each network interface in the aggregated communication link based on the network interface data received from the data store; and preparing new heartbeats with the heartbeat generator to account for any nonfunctional network interfaces and any added network interfaces.

In one example, the data store is further configured to maintain transmission and reception statistics of selected heartbeats based on the information sent by the sniffer device. Here, the transmission and reception statistics may include at least one of timestamps, counters and sequence numbers.

In another example, the link aggregation monitoring method further comprises displaying heartbeat statistics associated with the health status of selected network interfaces to a user.

In a further example, the link aggregation monitoring method also comprises assigning a slave ID to each network interface arranged in the aggregated communication link; and associating each slave ID with a unique address; wherein each network interface uses the unique address associated with the slave ID of its heartbeat's intended receiver as a destination address; and wherein each network interface uses the unique address associated with its assigned slave ID as the source address of its outgoing heartbeats. In this case, assignment of the slave IDs to respective network interfaces may depend on a link aggregation mode. And in another alternative, the link aggregation monitoring method may further comprise detecting a fail-over condition when a signal reports that a given one of the network interfaces arranged in the aggregated communication link has switched from a standby mode to a primary mode.

DETAILED DESCRIPTION

The aspects, features and advantages of the present invention will be appreciated when considered with reference to the following description of preferred embodiments and accompanying figures. The following description does not limit the present invention; rather, the scope of the invention is defined by the appended claims and equivalents.

Figure 1:
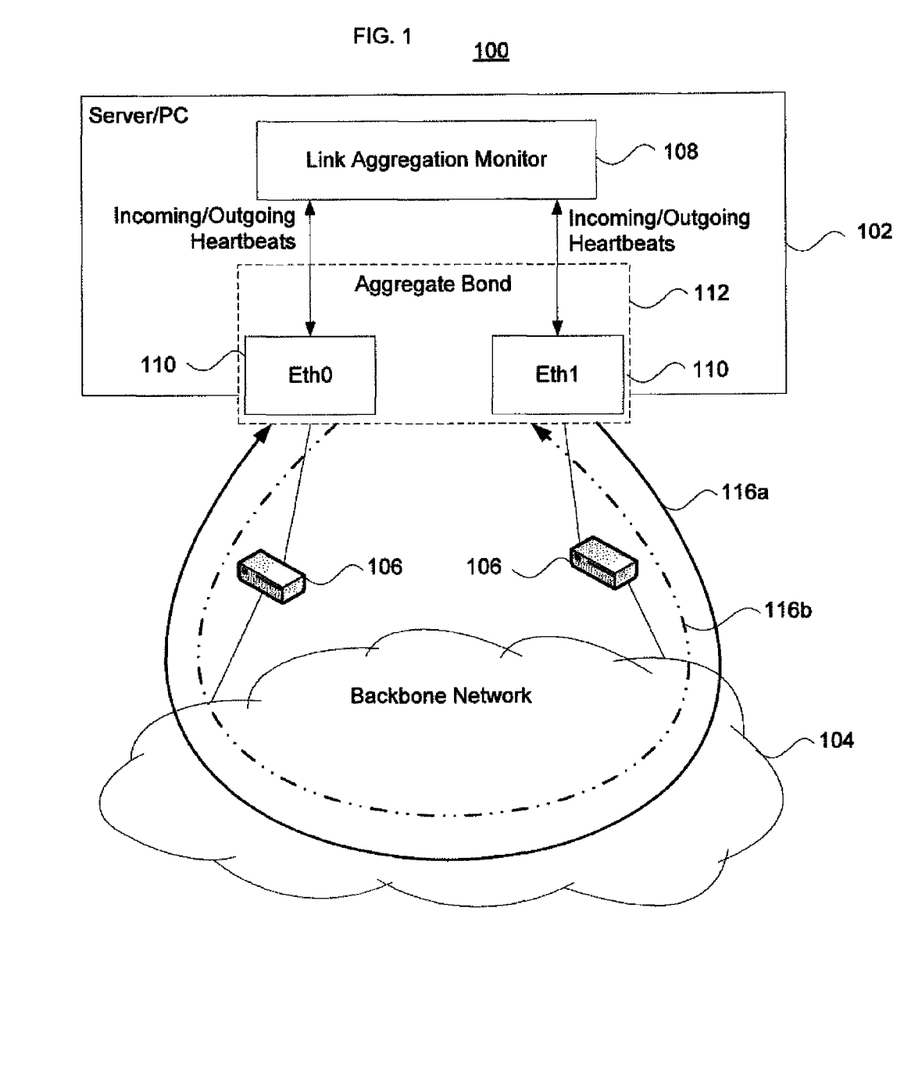
FIG. 1 illustrates a link aggregation monitoring system in accordance with aspects of the present invention.

FIG. 1 illustrates a system 100 that implements link aggregation monitoring in accordance with aspects of the present invention. The system 100 includes a host device 102, a backbone network 104, and internetworking devices 106 such as routers, hubs, bridges or switches. The host device 102 may comprise a server, PC, network switch etc. In one example, the host device 102 may be a switch used in a network datacenter. As shown, the host device 102 is coupled to the backbone network 104 via the internetworking devices 106.

The host device 102 includes a link aggregation monitor 108 and a pair of network interfaces 110 identified as "Eth0" and "Eth1". While only two network interfaces 110 are illustrated, more than two such interfaces may be employed with the embodiments of the invention presented herein. The network interfaces 110 are desirably aggregated into a single bond 112. As shown by arrows 114, the link aggregation monitor 108 enables the host device 102 to exchange "heartbeats" among the network interfaces 110 and monitor the transmit ("Tx") and receive ("Rx") health of the links to the backbone network 104. As used herein, the term "heartbeat" includes messages of a unique type that may be configured as data frames (e.g., Ethernet frames) for transmission among multiple network elements. Details and examples of various heartbeat formats are provided below.

The link aggregation monitor 108 desirably includes a heartbeat generator (not shown), which constructs heartbeats to be sent and forward the heartbeats to the desired network interfaces/device drivers. The network interfaces/device drivers will, in turn, transmit heartbeats out on a physical layer/medium ("PHY") to the backbone network 104. In addition, the heartbeat generator receives PHY down/up events of network interfaces, and removes/adds interfaces in a token ring or loop-type configuration.

As will be discussed in more detail below, the heartbeats are exchanged among network interfaces in a token-ring pattern. The heartbeats flow in one of two directions through the network interfaces 110, the internetworking devices 106 and the backbone network 104. For instance, as shown in FIG. 1, a first heartbeat 116a may pass in a clockwise direction first through network interface Eth1, through a first internetworking device, the backbone network, a second internetworking device and then through network interface Eth0. And a second heartbeat 116b may pass in a counterclockwise direction first through network interface Eth0, through a first internetworking device, the backbone network, a second internetworking device and then through network interface Eth1.

Figure 2:
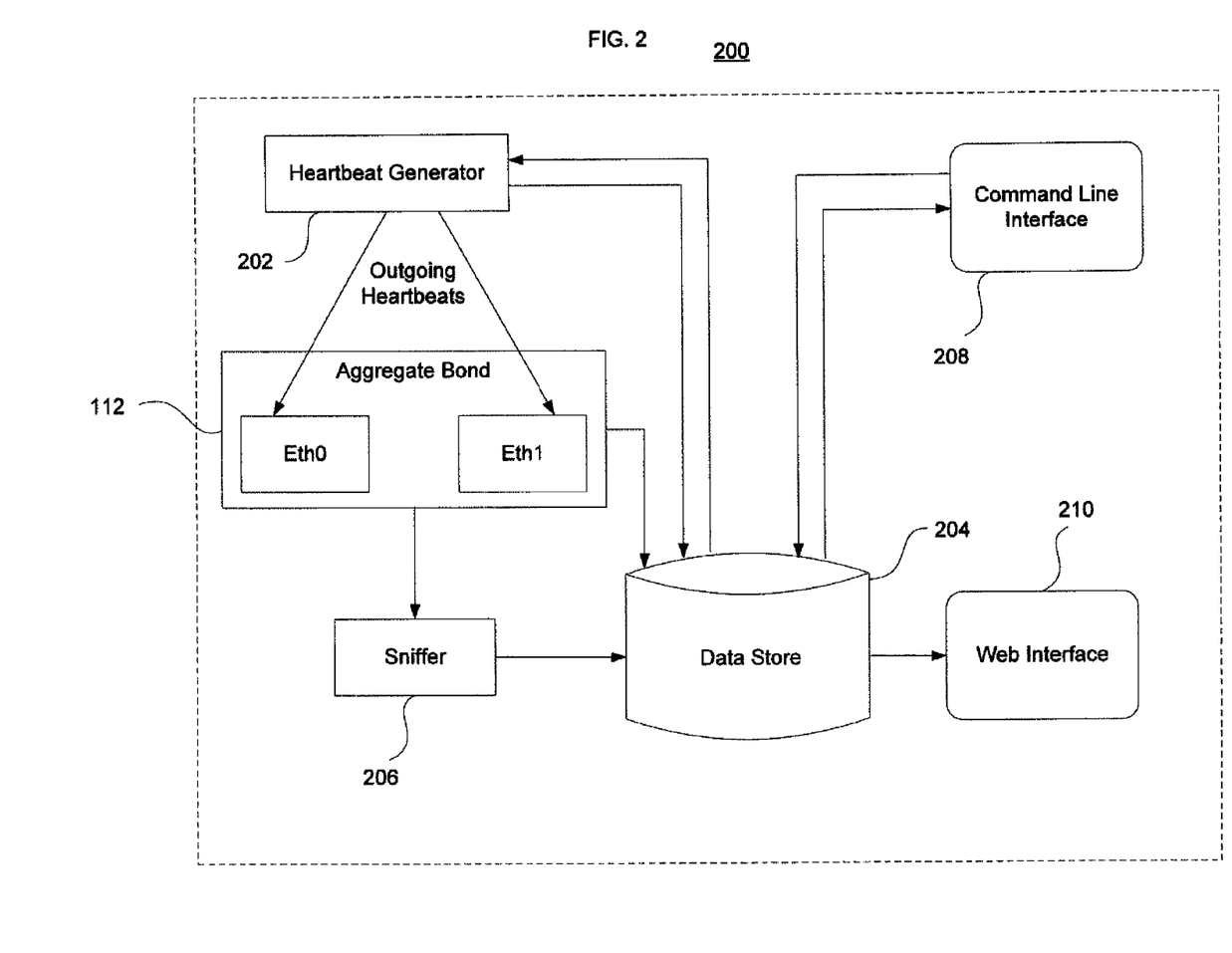
FIG. 2 illustrates a link monitoring apparatus in accordance with aspects of the present invention.

FIG. 2 is a block diagram 200 illustrating one example of the link aggregation monitor 108 of FIG. 1. The link aggregation monitor 108 may include or otherwise be logically associated with certain devices. As noted above, a heartbeat generator 202 is desirably part of the link aggregation monitor 108. Also shown in the block diagram 200 are a data store 204, a sniffer 206, a command line interface 208 and a web interface 210. Each of these elements may be part of the link aggregation monitor 108. Alternatively, some or all of these elements may be separate components and/or programs used by the link aggregation monitor. These elements are discussed in more detail below.

As noted above, the heartbeat generator 202 generates outgoing heartbeats. Source and destination MAC address of heartbeats are desirably provided by the data store 204. When a heartbeat is sent, the heartbeat generator 202 may send a transmit/Tx event to the data store 204, which increments a Tx counter maintained for all network interfaces 110 being aggregated (e.g., Eth0, Eth1).

A primary function of the data store 204 is to store, update, and output various information concerning the network interfaces 110. For each interface, the data store 204 may maintain source/destination MAC address of heartbeats to be transmitted from a given interface. The data store 204 may also maintain transmission and reception statistics of heartbeats and data such as timestamps (e.g., primary and standby slaves' Tx and Rx times), counters (e.g., primary and standby slaves' Tx and Rx counters) and sequence numbers (e.g., primary and standby slaves' Tx and Rx sequence numbers) may be received and maintained by the data store 204. It also desirably receives PHY up/down events, Tx/Rx events of heartbeats for network interfaces from other components, and updates its database accordingly. "PHY up" indicates that a driver or other device detects a carrier state on the network interface. The above information concerning network interfaces is provided to other components, such as the heartbeat generator 202, upon request.

The sniffer 206 intercepts or otherwise observes heartbeats received on the network interfaces 110. The sniffer desirably forwards information concerning received heartbeats (e.g., the incoming network interface, source/destination MAC address, sequence number of received hearbeats, and etc.) to the data store 204. By correlating the Tx/Rx counters and sequence numbers of primary and standby interfaces, the link aggregation monitor may determine any losses of heartbeats.

The command line interface 208 provides a user interface in which users may query Tx/Rx statistics regarding the network interfaces 110. The web interface 210 provides a web page displaying Rx/Tx statistics of the network interfaces 110. The command line and web interfaces may provide additional functionality, such as enabling a user to manage operation of the link aggregation monitor 108 and/or the aggregation bond 112 of the network interfaces 110.

In one embodiment, the link aggregation monitor 108 is implemented as a module run as a single process. The module desirably runs a loop that multiplex I/O events from at least the heartbeat generator 202 and the sniffer 206. In one example, the heartbeat generator 202 sends heartbeats periodically from Eth0 and Eth1. During its initialization, heartbeat generator 202 opens two raw sockets, one on Eth0 and the other on Eth1. Heartbeat generator 202 then adds a periodic alarm/indicator to send heartbeats from Eth0 and from Eth1 in an interleaved manner. This may be done at a fixed interval, which may be set or otherwise configured by a heartbeat interval flag.

In this example, the heartbeats from Eth0 are destined to Eth1, and vice versa, to monitor the Tx and Rx health of a standby link. The sniffer 206 desirably opens a raw socket on the aggregate bond to intercept all heartbeats received on Eth0 and Eth1. The above two threads will read and write into the data store 204, which holds transmission/reception statistics of heartbeats as well as other global control information including the heartbeat forma. Data store 204 may also serve link health requests triggered by user inputs. And the data store 204 may report link health data via the web interface 210.

Figure 3A:
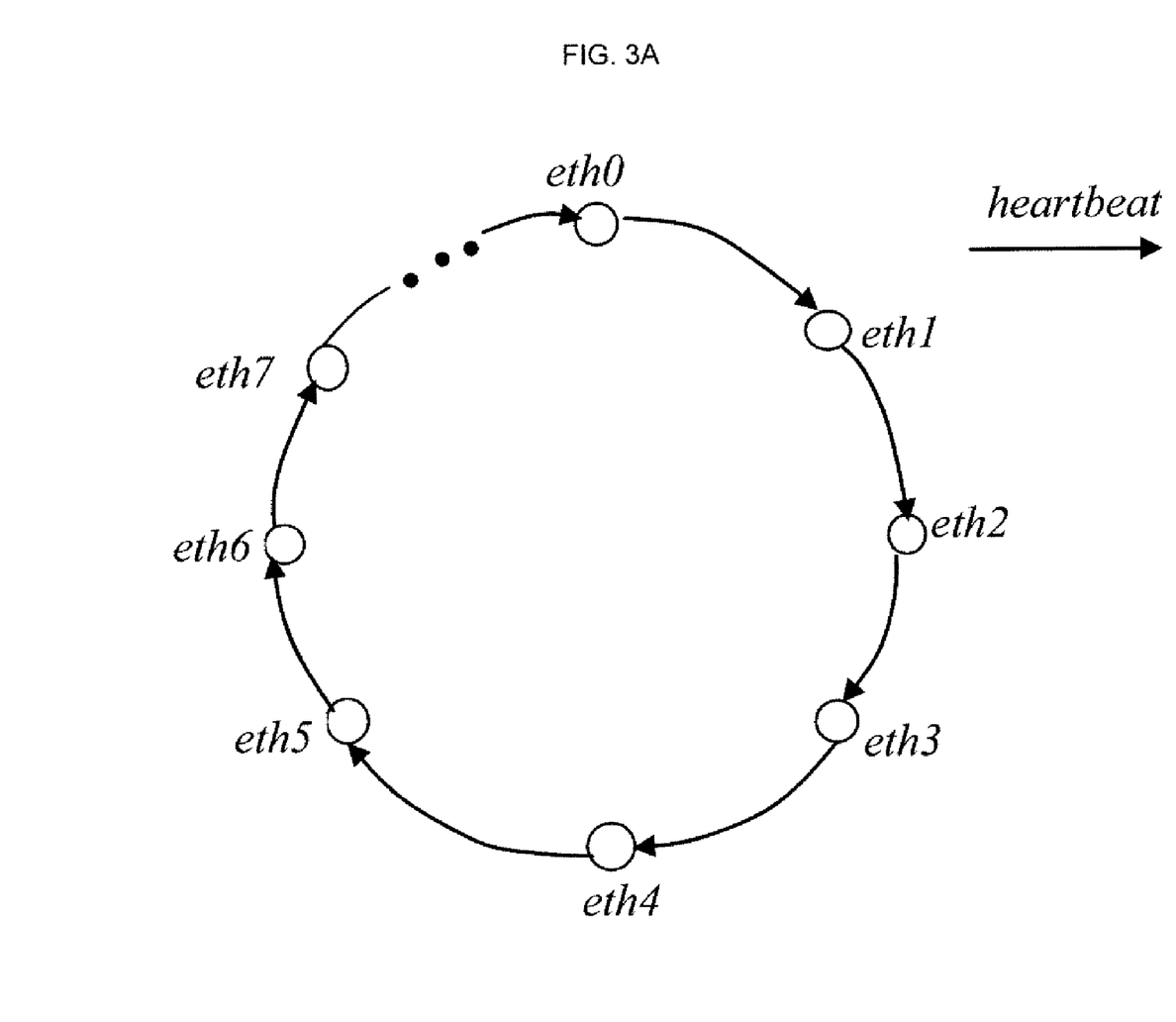
FIGS. 3A-C illustrate heartbeat distribution in accordance with aspects of the present invention.

FIG. 3A illustrates an exemplary token-ring arrangement for pairing multiple network interfaces 110 and exchange heartbeats among them in accordance with aspects of the present invention. As noted above, more than two network interfaces may be employed. In the example of FIG. 3A, eight network interfaces 110 (Eth0 . . . Eth7) are used. It should be understood that any number of network interfaces greater than two may be used in an aggregated bond 112 in accordance with aspects of the present invention.

In the example of FIG. 3A, it is assumed that all network interfaces are PHY up and can transmit data. The nth network interface, ethn, exchanges heartbeats with eth(n+1). In the present example, ethn is considered to be Tx healthy if eth(n+1) receives all heartbeats transmitted by ethn. ethn is considered to be Rx healthy if it receives all heartbeats from eth (n−1).

In accordance with an aspect of the present invention, when one interface ethi fails, it is removed from the token ring. The remaining interfaces maintain an aggregate bond. In this case, eth(i−1) now sends heartbeats to eth (i+1). eth(i−1) is considered to be Tx healthy if eth (i+1) receives all heartbeats from eth (i−1). Similarly, eth(i+1) is considered to be Rx healthy if it receives all heartbeats from Eth(i−1).

Figure 3B:
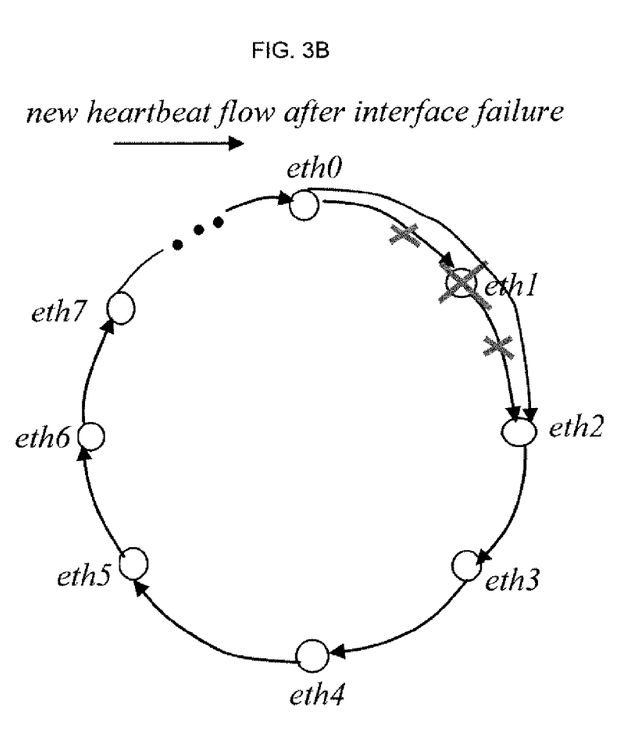
Figure 3C:
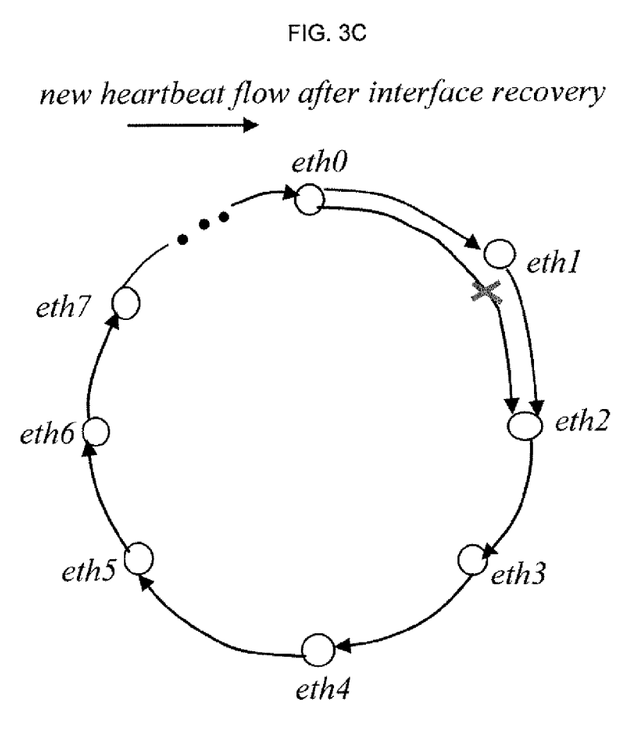

An example on how heartbeat flow changes as interfaces go up and down is shown in FIGS. 3B-C. In FIG. 3B, when eth1 is PHY down, eth0 starts to send heartbeats directly to eth2. In this case, eth1 is removed from the token ring. Information regarding the modified token ring may be stored in data store 204. New/modified heartbeats are generated by the heartbeat generator 202 using such information.

At some point, the disabled/inactive interface eth1 may become fully operational. When this occurs, the interface eth1 may be incorporated into the token ring. As shown in FIG. 3C, when eth1 transits from PHY down to up, eth1 is added to the token ring. In this case, the heartbeat(s) are reconfigured so that eth0 sends a heartbeat to eth1 and eth1 sends heartbeats to eth2.

Figure 4:
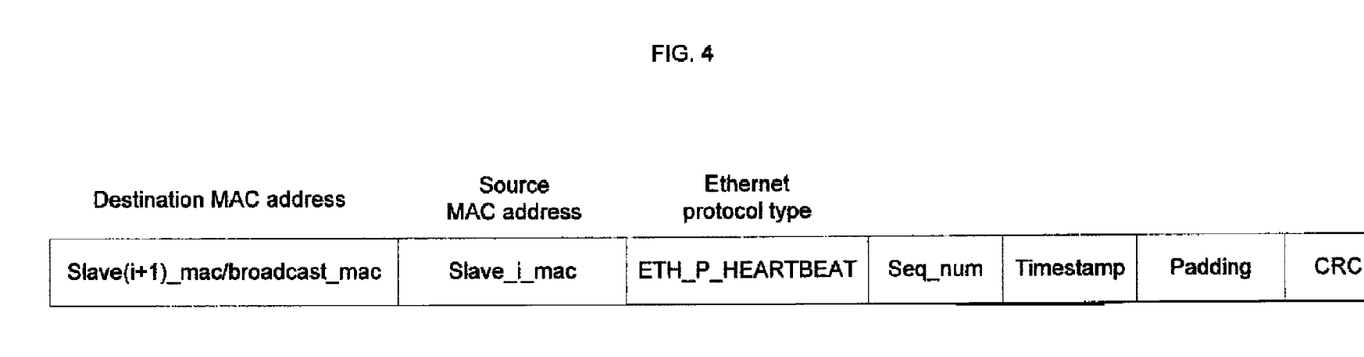
FIG. 4 illustrates a heartbeat configuration in accordance with aspects of the present invention.

The heartbeats in accordance with aspects of the present invention include the format shown in FIG. 4. Heartbeats are desirably configured as Ethernet frames with a new ether-_type, ETH_P_HEARTBEAT, to distinguish them from other types of ethernet frames, such as ARP, IP etc. Each heartbeat carries a sequence number (e.g., 32 bits), generated by the sending network interface, a timestamp field (e.g., 64 bits) recording the system time when the heartbeat is generated, and optionally a padding field if needed to satisfy the minimum length of an Ethernet frame. The length of the padding field may be reduced to accommodate new fields in the heartbeat frame. Note that heartbeats are sent from and received by the same server host. Therefore, byte ordering of fields in the heartbeats is not a problem.

To identify the sending network interface of a given heartbeat, each network interface is assigned a slave ID. Each slave id is desirably assigned a unique MAC address. A network interface may always use the MAC address assigned to its slave ID as the source MAC of its heartbeats. The network interface uses the MAC address assigned to the slave ID of its heartbeats' intended receiver (such as in the token ring of FIGS. 3A-C) as the destination MAC address. As shown in FIG. 4, network interface ethi is desirably assigned slave ID i, and its heartbeats are sent to slave ID (i+1).

In accordance with another aspect of the present invention, assignment of MAC addresses to slave ID, and assignment of slave IDs to network interfaces depends on the mode of link aggregation. These include load balancing mode and active/standby mode. In active/standby mode, only one network interface, referred to as the primary slave, is actively transmitting and receiving. When the primary slave fails, one standby slave is selected to become the new primary slave and to transmit/receive traffic. The active/standby mode is used when a switch or other device connected to the slave interfaces does not support link aggregation, and can associate a MAC address to only one interface at any time. The associated interface of specific MAC address can change over time. In one example, each switch is deployed with at least two network interfaces aggregated in active/standby mode.

By correlating heartbeat Tx/Rx counts of a standby network interface with heartbeat Tx/Rx counts of a primary network interface, the Tx/Rx quality of a standby link may be determined by the link aggregation monitor 108.

In load balancing mode, traffic originated from (the application of) the server host is spread across all network interfaces that are PHY up. In both modes, application traffic sent by the host (from different network interfaces) carries the same MAC, referred to as primary MAC, which is typically eth0's permanent MAC address stored in its EEPROM.

In load balancing mode, each network interface is assigned a unique slave ID ranging from 0 to n−1, where n is the total number of available network interfaces. Each slave needs a unique MAC address which is different from the primary MAC address. Among the total n different MACs required, n−1 can be selected from the permanent MAC addresses of network interfaces being aggregated, whose MACs are not chosen as the primary MAC. The nth MAC address used for this scheme is new. In one example, the assignments of MAC addresses to slave ID, and assignment of slave IDs to network interfaces, never changes.

In active/standby mode, the assignments of a MAC address to a slave ID desirably never changes. Thus, in an example, slave id 0 is assigned the primary MAC. Slave IDs 1 to n−1 are each assigned a unique MAC from the other (n−1) permanent MAC addresses of network interfaces which are not used as the primary MAC. The assignment of slave IDs to network interfaces changes as interfaces go up and down. The active interface may always be assigned to slave ID 0, and standby interfaces may be assigned to slave IDs 1 to n−1.

When a standby network interface is PHY down, existing "alive" network interfaces desirably do not change their slave IDs. When the active network interface "dies," the new active network interface may switch to slave ID 0. When a network interface becomes alive again, if it is not the active interface, it may employ a slave ID between 1 to n−1 that is not being used by any other alive interface. If a network interface replaces the existing active interface (to be the new active interface), then in this example the replacement network interface uses slave id 0. The previous active interface would then change to a slave ID ranging from 1 to n−1 that is not used by any other alive interface.

In the example of FIG. 3A, if a heartbeat is lost, both the sender (A) and the receiver (B) of that heartbeat may be the cause of the failure. To further identify which interface is faulty, in accordance with another aspects of the present invention the sender of the heartbeat now sends broadcast heartbeats (with a broadcast MAC address as the destination). If at least one interface in the token ring receives the broadcast heartbeats, the receiver (B) is determined to be faulty. The receiver is then removed from the token ring as illustrated in FIG. 3B. If no interfaces in the token ring receive the broadcast heartbeats, then the sender (A) is considered as faulty.

The sender is then removed from the token ring. This process continues until all faulty interfaces are identified and removed from the token ring.

To minimize bandwidth usage, heartbeats may be configured as unicast frames whenever possible. Heartbeats may have broadcast destination addresses in the active/standby mode of link aggregation, when the switch has incorrect knowledge of a port attached to a MAC address. This situation occurs after a fail-over, when a formerly standby slave now becomes the new active slave and is assigned a different slave ID and thus new MAC address. The switch desirably learns the new port attached to a MAC address through the heartbeats initiated from this MAC address. After fail over, if a network interface is assigned a different MAC address, the destination address of heartbeats sent to this network interface should first be set to a broadcast MAC address, and then set to its newly assigned MAC address, after the sniffer has received heartbeats from this network interface using the newly assigned MAC address. To keep track of the appropriate destination MAC address to use for outgoing heartbeats, the link aggregation monitor desirably maintains a variable heartbeat_destination_mac for each network interface. Upon a fail-over, for network interfaces assigned with different MAC addresses, their heartbeat_destination_MAC addresses are desirably reset to a predetermined address, such as ff:ff:ff:ff:ff:ff. Once the sniffer has received a heartbeat from these interfaces, heartbeat_destination_MAC addresses of these interfaces are changed to their newly assigned MAC addresses. Fail-over is detected by the heartbeat generator when a signal on a bonding driver reports that a network interface switches from "standby" to "primary".

The sniffer 206 may monitor such operations/events and direct the data store 204 to modify its database accordingly. As faulty network interfaces are identified and removed from the token ring, the data store database is updated, and the heartbeat generator 202 may configure new or modified heartbeats accordingly. Such information may be provided to the command line and/or web interfaces.

While certain steps and configurations have been described and illustrated in a particular order, it should be understood that such actions may occur in a different order or concurrently. By way of example, the token ring configuration of FIG. 3A illustrates an aggregate bond including all network interfaces eth0 through eth7. However, different token ring topologies may be employed. For instance, one or more aggregate bonds may be configured. In this case, a first aggregate bond may include a subset of network interfaces arranged in a token ring, such as interfaces eth0, eth2, eth4 and eth6. A second aggregate bond may include a second subset of network interfaces arranged in another token ring, such as interfaces eth1, eth3, eth5 and eth7. Furthermore, the token ring configurations disclosed herein may be used on machines in any network topology. Each machine on the network may employ its own set of heartbeats in its own token ring configuration.

The invention claimed is:

1. A link aggregation system in a computer network, comprising: a plurality of network interfaces including a first network interface and a second network interface aggregated into a single bond and providing an aggregated communication link to a network; and a link aggregation monitor coupled to the aggregated first and second network interfaces, the link aggregation monitor configured to provide heartbeats to and receive heartbeats from the aggregated network interfaces to determine a health status of each aggregated network interface; wherein each heartbeat is configured by the link aggregation monitor as an Ethernet frame having a destination address, source address and heartbeat identifier, and wherein the Ethernet frame further includes a heartbeat sequence identifier, a timestamp to record a system time when a given heartbeat is generated, and a padding field for satisfying a minimum length of the Ethernet frame, the length of the padding field is reduced to accommodate new fields in the heartbeat.

2. The link aggregation system of claim 1, wherein if a given one of the plurality of network interfaces fails, the given network interface is removed from the aggregated bond and the link aggregation monitor prepares new heartbeats configured to omit the failed network interface.

3. The link aggregation system of claim 1, wherein if an additional network interface becomes available, the additional network interface is added to the aggregated bond and the link aggregation monitor prepares new heartbeats configured to include the added network interface.

4. The link aggregation system of claim 1, wherein the aggregated network interfaces are arranged in a token ring configuration and the heartbeats are routed around the token ring.

5. A link aggregation monitoring apparatus, comprising: a heartbeat generator configured to prepare heartbeats for a plurality of network interfaces arranged in an aggregated communication link to a network; a data store configured to maintain source and destination addresses of the heartbeats for use by each of the network interfaces, the data store being further configured to provide network interface data to the heartbeat generator; and a sniffer device configured to observe the heartbeats received by the plurality of network interfaces, the sniffer device being further configured to send information associated with the observed heartbeats to the data store; wherein the heartbeat generator is further configured to analyze a health status of each network interface in the aggregated communication link based on the network interface data received from the data store, and to prepare new heartbeats to account for any nonfunctional network interfaces and any added network interfaces; wherein each heartbeat is configured as an Ethernet frame having a padding field for satisfying a minimum length of the Ethernet frame, the length of the padding field being reduced to accommodate new fields in the heartbeat.

6. The link aggregation monitoring apparatus of claim 5, wherein the data store is further configured to maintain transmission and reception statistics of selected heartbeats based on the information sent by the sniffer device.

7. The link aggregation monitoring apparatus of claim 6, wherein the transmission and reception statistics include at least one of timestamps, counters and sequence numbers.

8. The link aggregation monitoring apparatus of claim 5, further comprising a user interface configured to display heartbeat statistics associated with the health status of selected network interfaces.

9. The link aggregation monitoring apparatus of claim 5, wherein each network interface arranged in the aggregated communication link is assigned a slave ID associated with a unique address, and each network interface uses the unique address associated with the slave ID of its heartbeat's intended receiver as a destination address.

10. The link aggregation monitoring apparatus of claim 9, wherein assignment of the slave IDs to respective network interfaces depends on a link aggregation mode.

11. The link aggregation monitoring apparatus of claim 9, wherein the heartbeat generator is further configured to detect a fail-over condition when a signal reports that a given one of the network interfaces arranged in the aggregated communication link has switched from a standby mode to a primary mode.

12. A link aggregation method for use in a computer network, the method comprising: configuring a plurality of network interfaces including a first network interface and a second network interface into an aggregated single bond for providing an aggregated communication link to a network; providing heartbeats to the aggregated network interfaces for circulation among each of the network interfaces in the aggregated single bond; receiving the heartbeats from the aggregated network interfaces; and determining a health status of each aggregated network interface based upon the received heartbeats; wherein each heartbeat is configured as an Ethernet frame having a destination address, source address and heartbeat identifier, and wherein the Ethernet frame further includes a heartbeat sequence identifier and timestamp to record a system time when a given heartbeat is generated, a timestamp to record a system time when a given heartbeat is generated, and a padding field for satisfying a minimum length of the Ethernet frame, where the length of the padding field is reduced to accommodate new fields in the heartbeat.

13. The link aggregation method of claim 12, wherein if a given one of the plurality of network interfaces fails, the method further comprises:
    removing the failed network interface from the aggregated bond; and
    preparing new heartbeats configured to omit the failed network interface.

14. The link aggregation method of claim 12, wherein if an additional network interface becomes available, the method further comprises:
    adding the additional network interface to the aggregated bond; and
    preparing new heartbeats configured to include the added network interface.

15. The link aggregation method of claim 12, wherein the aggregated network interfaces are arranged in a token ring configuration and the heartbeats are routed around the token ring.

16. A link aggregation monitoring method, comprising: preparing heartbeats for a plurality of network interfaces arranged in an aggregated communication link to a network; maintaining in a data store source and destination addresses of the heartbeats for use by each of the network interfaces, the data store being configured to provide network interface data to a heartbeat generator; observing the heartbeats received by the plurality of network interfaces with a sniffer device, the sniffer device being configured to send information associated with the observed heartbeats to the data store; analyzing a health status of each network interface in the aggregated communication link based on the network interface data received from the data store; and preparing new heartbeats with the heartbeat generator to account for any nonfunctional network interfaces and any added network interfaces; wherein each heartbeat is configured as an Ethernet frame having a padding field for satisfying a minimum length of the Ethernet frame, the length of the padding field being reduced to accommodate new fields in the heartbeat.

17. The link aggregation monitoring method of claim 16, wherein the data store is further configured to maintain transmission and reception statistics of selected heartbeats based on the information sent by the sniffer device.

18. The link aggregation monitoring method of claim 17, wherein the transmission and reception statistics include at least one of timestamps, counters and sequence numbers.

19. The link aggregation monitoring method of claim 16, further comprising displaying heartbeat statistics associated with the health status of selected network interfaces to a user.

20. The link aggregation monitoring method of claim 16, further comprising:

assigning a slave ID to each network interface arranged in the aggregated communication link; and associating each slave ID with a unique address;

wherein each network interface uses the unique address associated with the slave ID of its heartbeat's intended receiver as a destination address; and wherein each network interface uses the unique address associated with its assigned slave ID as the source address of its outgoing heartbeats.

21. The link aggregation monitoring method of claim 20, wherein assignment of the slave IDs to respective network interfaces depends on a link aggregation mode.

22. The link aggregation monitoring method of claim 20, further comprising detecting a fail-over condition when a signal reports that a given one of the network interfaces arranged in the aggregated communication link has switched from a standby mode to a primary mode.

* * * * *